A. J. E. LARSON

BINDING MEANS FOR THE SURFACE COVERINGS OF FURNITURE

May 19, 1931. Original Filed Oct. 6, 1922 Re. 18,077

INVENTOR.
Algot J. E. Larson
by Parker & Prochnow,
ATTORNEYS.

Reissued May 19, 1931

Re. 18,077

UNITED STATES PATENT OFFICE

ALGOT J. E. LARSON, OF JAMESTOWN, NEW YORK, ASSIGNOR TO ART METAL CONSTRUCTION COMPANY, OF JAMESTOWN, NEW YORK

BINDING MEANS FOR THE SURFACE COVERINGS OF FURNITURE

Original No. 1,705,156, dated March 12, 1929, Serial No. 592,747, filed October 6, 1922. Application for reissue filed March 12, 1931. Serial No. 522,115.

Desks, tables and analogous flat-topped articles of furniture, particularly when made of metal, are commonly provided with a top surface covering of linoleum or other suitable sheet or plate material which furnishes a desirable and durable top surface for the desk or other top.

This invention relates to means for protecting, and preferably for binding and securing the edges of such cover or surface sheets or plates for desks and other articles of furniture and providing an attractive and durable edge finish for the desk or other top.

One object of the invention is to provide an edge binding or securing construction for the top surface coverings of desks and other furniture which will confine and securely hold the edges of the covering and produce a durable and ornamental edge finish for the furniture. Other objects of the invention are to produce a practical and desirable edge binding means for the cover or surface sheet or plate, including a binding or finishing strip which can be readily and quickly secured in place to protect and confine the edge or edges of the cover or surface sheet or plate, and requires no fastening devices for securing the binding or finishing strip in place; also to improve the edge binding and finishing means for the covering material of desks and other articles of furniture in the respects hereinafter described and set forth in the claims.

Figure 1:
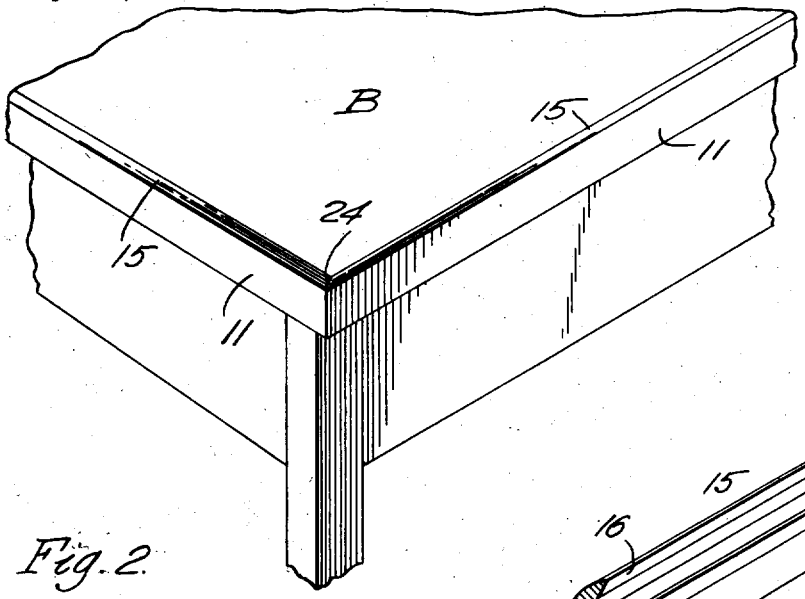
Fig. 1 is a fragmentary, perspective view on a reduced scale, of the top of a desk or other article of furniture provided with means embodying the invention for securing the cover sheet or plate of the top in position, and forming a finished edge or binding for the top.
Figure 2:
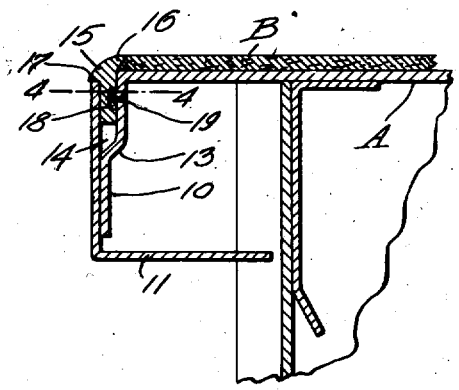
Fig. 2 is a vertical section thereof on an enlarged scale.
Figure 3:
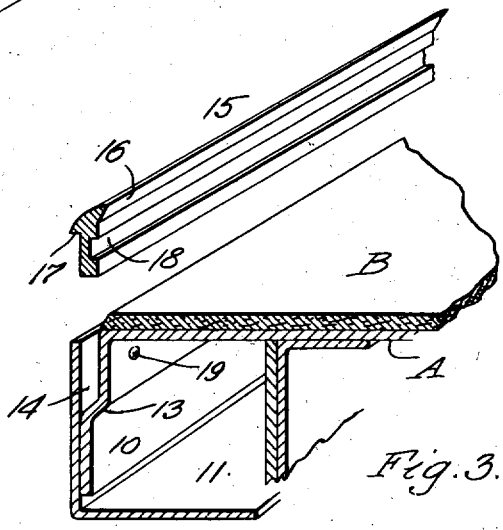
Fig. 3 is a fragmentary, sectional, perspective view showing the binding or finishing strip in position for insertion into place.
Figure 4:
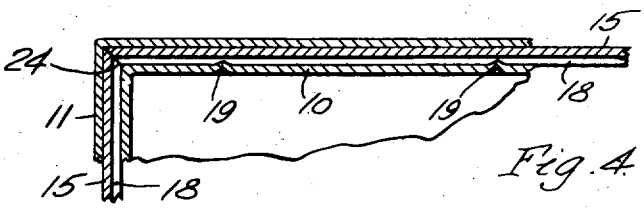
Fig. 4 is a sectional plan view on line 4—4, Fig. 2.

A represents the metal top plate of a desk or other article of metal furniture, and B represents a cover sheet or plate which is secured thereon and forms the top surface of the desk or other top. The cover sheet or plate B may be linoleum or any other suitable material adapted to provide a desirable and durable top surface for the desk or article of furniture. The cover sheet or plate may be secured on the top, as usual, by a suitable adhesive or in any other suitable way.

The top plate is provided with a deep, hollow flange to give the edges of the top the desired thickness and stiffness, and in the construction shown, this hollow flange is formed by bending vertically downward the edges of the top plate A, thereby forming a depending vertical flange 10, and supplementing this flange by an edge strip preferably in the form of an angle piece 11 having a vertical flange which extends upwardly outside of the depending flange 10, and a horizontal flange which extends inwardly beneath the lower edge of the depending flange 10. This angle piece is rigidly secured by spot welding, or in any other suitable manner to the depending flange 10, and the latter is provided between its upper and lower edges with an offset 13, so that an upwardly opening, narrow groove or recess 14 is left between the upper portion of the angle piece and the flange 10. 15 represents a binding or finishing strip which is inserted into the groove 14 and is preferably made of such cross sectional shape as to overhang and secure, as well as protect, the edge of the cover sheet or plate B, and form an attractive, finished corner for the edge of the top A. As shown in Figs. 1–4, this binding or finishing strip is an extruded shape, preferably made of bronze, and as best seen in the enlarged view, Fig. 3, has at its upper edge an inwardly extending lip 16 with a thin edge adapted to overhang and bear upon the edge of the cover sheet or plate B, substantially flush with the top surface of the latter, so as to confine and protect the edge of the cover sheet or plate and hold it firmly down on the underlying top plate A. The binding or finishing strip also has at its outer side an outwardly projecting shoulder 17 adapted to overhang and rest upon the upper edge of the angle-piece 11, and preferably the upper surface of the binding or finishing strip is curved from its top edge or lip 16 to the outer edge of the shoulder 17, so that when the strip is applied to the top, this rounded portion forms a rounded or bevelled corner for the desk or other top extending from the top face of the cover sheet B to the outer face of the angle-piece. The exposed upper portion of the binding strip thus covers and conceals the edge of the cover sheet or plate B, and also the upper edge of the angle-piece 11, and forms a smooth, ornamental edge corner for the top. In its inner side or face the binding or finishing strip 15 is provided with a shallow, longitudinal groove or channel 18 into which project shallow blisters or projections 19 formed on the outer face of the flange 10 of the top for retaining the binding strip in place in the groove 14. These projections can be conveniently produced by means of a prick punch. The binding or finishing strip can be readily forced downwardly into place in the groove 14 and will snap over the projections 19, which, by projecting into the groove 18, serve to hold the binding or finishing strip in place.

Figure 5:
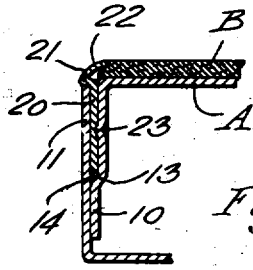
Fig. 5 is a section similar to Fig. 2, showing a binding or finishing strip of slightly modified form.
Figure 6:
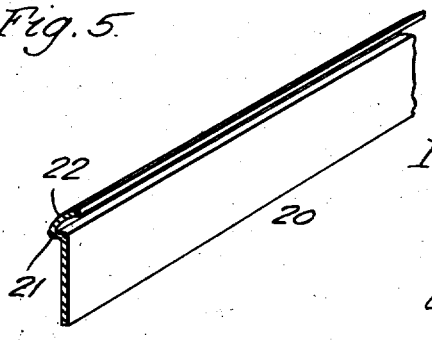
Fig. 6 is a sectional perspective view of a portion of the binding or finishing strip shown in Fig. 5.

In the construction shown in Figs. 5 and 6, the binding or finishing strip 20 consists of a thin strip of wrought bronze formed up into the shape shown to provide at its upper portion an outwardly projecting shoulder 21 to overhang the upper edge of the angle-piece 11, and an inwardly and upwardly curved portion 22 which forms the rounded or bevelled finishing corner for the desk or other top and the inwardly projecting lip or edge which overhangs and secures in place the edge of the cover sheet or plate B. The binding or finishing strip formed as shown in this modification is applied in a similar way by forcing or pressing it downwardly into the groove 14. In this form of the strip it is not grooved or channelled at its inner side, but the depending flange 10 of the top is provided with shallow blisters or projections 23 which bear against the inner face of the binding or finishing strip, and hold the latter in the groove by the pressure or friction of the blisters or projections thereon. The projections 23 can be, if desired, conveniently formed by means of a prick punch after the binding strip has been inserted into the groove, in which case the forming of the projections will produce slight indentations in the binding or finishing strip in which the projections seat, thereby securely holding the binding strip in place.

The invention has been hereinbefore described for use in connection with covering sheets or plates for the tops of furniture, but manifestly the improvements are adapted for use in a similar manner with analogous surface coverings for other surfaces or parts of furniture or other articles. It will be understood that the construction described can be used at any one or more of the edges of the article as may be desired. For instance, in the case of a rectangular, flat desk or other top, the binding means is employed at the four edges of the top. In such case the binding strips 15 at the several edges are formed with bevelled ends which meet in miter joints at the corners of the top, as indicated at 24 in Figs. 1 and 4.

I claim as my invention:

1. The combination with the top member of an article of furniture, and a surface covering for the same, of an edge strip rigidly secured to said top member and extending along the edge face thereof, said edge face and said edge strip forming between them a groove with fixed walls which opens adjacent the edge of said covering, and a removable, unattached binding strip seated in said groove and having a protruding portion which conceals the groove and bounds the edge of said covering, said binding strip being releasably secured in said groove by engagement with rigid parts of the fixed walls of the groove.

2. The combination with the top member of an article of furniture, and a surface covering for the same, of an edge strip rigidly secured to said top member and extending along the edge face thereof, said edge face and said edge strip forming between them a groove with fixed walls which opens adjacent the edge of said covering and a removable, unattached binding strip seated in said groove and having a protruding portion which conceals said groove and bounds the edge of said covering, one of the walls of said groove having spaced projections which engage said binding strip to releasably retain the same in said groove.

3. The combination with an article of furniture having a wall thereof provided with a marginal angular flange, and a surface covering for said wall, of a metal strip rigidly secured to said flange and extending along the outer side thereof, said flange and strip forming between them a groove with fixed walls which opens adjacent the edge of said covering, and a binding strip seated in said groove and having a protruding portion which conceals said groove and bounds the edge of said covering, said binding strip having a recess in one face, and rigid, spaced projections which extend from one of the walls of said groove into said recess to releasably retain the binding strip in said groove.

4. The combination with a metal plate having a marginal angular flange, and a surface covering for said plate, of a metal strip rigidly secured to said flange and extending along the outer side thereof, said flange having a portion spaced from and forming a groove between the same and said strip, and a binding strip removably retained in said groove by engagement with walls of the groove and having a protruding portion which bounds the adjacent edge of said covering.

5. The combination with a metal plate having a marginal flange, and a surface covering for said plate, of a metal strip rigidly secured to said flange and extending along the outer side thereof, said flange and strip having spaced apart portions forming a groove with fixed walls between said flange and said strip which opens adjacent the edge of said covering, a separate binding strip secured in said groove and having a protruding portion which bounds the adjacent edge of said covering, and a portion which overhangs the edge of said metal strip and is substantially flush with the outer face of said metal strip, and projections which extend from one of the fixed walls of said groove and engage said binding strip to releasably retain the same in said groove.

6. The combination with a top member of an article of furniture, and a surface covering for the same, of an edge strip rigidly secured to said top member and extending along the edge thereof, said edge and said edge strip forming between them a groove with fixed walls which opens adjacent the edge of said covering, and a removable, unattached binding strip seated in said groove and having a protruding portion which bounds the edge of said covering, said binding strip being releasably secured in said groove by engagement with rigid parts on the fixed walls of the groove.

7. An article of furniture comprising a top member, a surface covering for the same, wall means carried by the top member forming a fixed slot of elongated cross section opening along the edge of the surface covering, and a removable, unattached binding strip seated in said groove and withdrawable through the opening thereof, the binding strip having a protruding portion which binds the edge of said covering and being secured in the groove by engagement with said wall means, said securement being releasable for the withdrawal of the binding strip without removal of said wall means.

To which foregoing specification and claims the applicant hereby subscribes his name at Jamestown, New York, this 10th day of March, 1931.

ALGOT J. E. LARSON.